Feb. 20, 1962 T. F. KILROY 3,022,366
BATTERY SEPARATOR AND MANUFACTURE THEREOF
Filed March 30, 1955

INVENTOR.
THOMAS F. KILROY

BY Oscar L. Spencer
ATTORNEY

United States Patent Office 3,022,366
Patented Feb. 20, 1962

3,022,366
BATTERY SEPARATOR AND MANUFACTURE
THEREOF
Thomas F. Kilroy, Franklin Square, N.Y., assignor to Pittsburgh Plate Glass Company, Allegheny County, Pa., a corporation of Pennsylvania
Filed Mar. 30, 1955, Ser. No. 497,906
5 Claims. (Cl. 136—145)

The present invention relates to a battery separator and to a method of making a battery separator and it has particular relation to a battery separator composed of a porous mat of entangled glass fibers having at least one dense fibrous surface with a microporous layer being adhered to the dense surface.

A conventional electric storage battery is composed of positive and negative plates submerged in a suitable electrolyte such as sulfuric acid with separators and retainer mats positioned between the plates. The function of the retainer mats is to hold active oxide pastes in place against the positive plates. The separators perform two conflicting functions. They must be porous to permit the acid to permeate them sufficiently so that the battery will not have too high an internal resistance. On the other hand, they must block off the passage of solid particles from one plate to the other, as otherwise these particles would tend to build up between the plates and short circuit the battery. This is known as "treeing." It is also essential that the battery separator be arranged so that vertical movement of the acid is permitted, since the acid tends to follow a circulatory movement when the battery is in use. Further, it is necessary that the separators provide a vent for the gases that are formed during the operation of the battery.

An excellent battery separator which also performs the function of a retainer mat is a commercially available separator composed of a porous mat of glass fibers, such as shown in U.S. Patent No. 2,578,534, having a microporous layer adhered to a surface thereof and slightly impregnating it. The glass fibers are loosely felted or entangled in such a way that the mat is highly porous. It acts as a retainer mat and also provides channels for the acids and gases to flow through the battery. The microporous layer is formed essentially of finely divided, inorganic, acid-resistant particles, such as diatomaceous earth, bonded together by an inorganic, acid-resistant binder. The organic binder is present in amount sufficient to bind the particles together but not to form a continuous film of binder and destroy the porosity of the layer. The microporous layer permits flow of the acid therethrough, but prevents the movement of particles of the active oxide pastes from one plate to the other.

In addition to the functions set forth above, the battery separator must have certain other physical characteristics required by the manufacturing process employed to make the batteries. For example, the separator should be tough and rigid enough to be forced in between the assembled plates without damaging the separator. It is also desired by some battery manufacturers that the separator have a rubbery feel. The microporous layer should not blister nor disintegrate in the acid, nor should it separate from the glass fiber layer.

It is of prime importance that no "pin holes" be present in the battery separator. "Pin hole" is a term employed to describe an opening in the microporous layer of sufficient size to permit passage of active particles through the layer and thereby cause "treeing" in the battery. The "pin holes" in a battery separator are created during the manufacture of the separator.

In the manufacture of a battery separator of the type described, the microporous layer is first formed as an aqueous slurry or suspension containing the fine particles and a binder. A thickener such as ammonium alginate is usually added to the slurry to maintain it at proper viscosity for application to the mat. The slurry is then applied as a uniform coating on the layer of glass fibers. The coating may be spread over the layer of glass fibers in any desired manner, such as by the use of a roller coater or by flowing the coating onto the surface of the glass fiber layer and then passing the coated layer under a doctor blade. The coated layer of fibers is heated to drive off the water and bind the particles to each other and to the glass fibers. As a result of this heating and the volatilization of the water, porosity is attained in the layer.

During the heating step, the viscosity of the slurry coating initially decreases and then increases. As the viscosity of the coating decreases, there is a tendency for it to move down into the interstices of the glass fiber mat. The coating at this point is somewhat thinner than at other points in the coating and constitutes a weak portion thereof where "pin holes" are most likely to occur. Rejections due to "pin holes" of battery separators produced in this manner average around 20 percent of production and have been as high as 45 percent of production. These rejections have been higher than average when copolymers of butadiene and styrene, especially copolymers containing about 60 or more percent by weight of styrene, were employed as the binder. It is preferred to use these copolymers as binders because they provide a separator which is tough and rigid.

In accordance with the present invention a battery separator of the type described above is provided which is tougher and firmer, both when wet with acid and dry, more rigid and can be made substantially free from "pin holes." The separator of this invention also provides freer circulation of acids through the battery. The production of such a battery separator has been enabled by the use of a glass fiber mat wherein the layers of fibers adjacent to and supporting the microporous layer are made of finer fibers arranged in very dense relation. Other layers in the mat are composed of thicker fibers and are highly porous so as to permit acid circulation in the battery.

The glass fiber mat is made by stretching a condensed mat of glass fibers which is produced by drawing a group of fibers from a furnace, collecting them as a plurality of layers on a spinning drum and varying the speed of rotation of the drum during the formation of the fibers and collection thereof on the drum. An aqueous slurry of finely divided particles and binder therefor is then applied to the surface of the glass fiber mat which contains the fine and densely distributed fibers.

The invention is described further by reference to the drawing in which.

Figure 1:
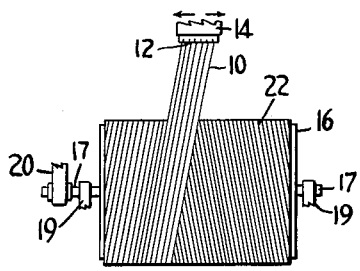
FIG. 1 is a diagrammatic elevation of apparatus suitable for practice of the invention.
Figure 2:
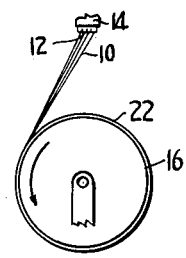
FIG. 2 is a side view of the apparatus of FIG. 1.
Figure 3:
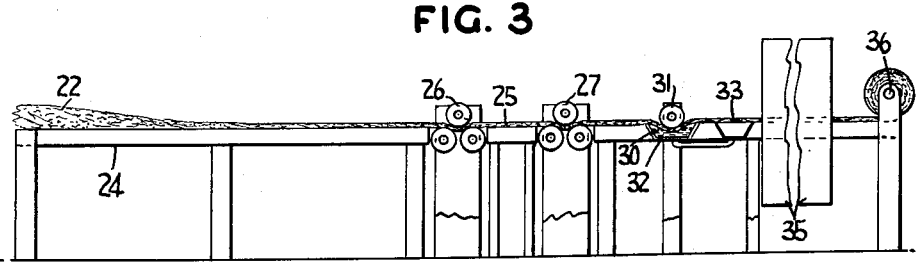
FIG. 3 is a diagrammatic elevation of additional apparatus suitable for practice of the invention.
Figure 4:
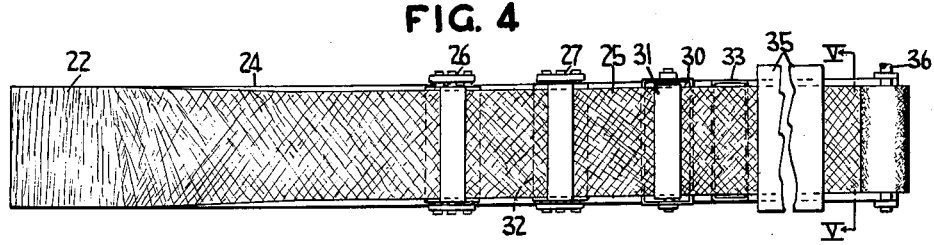
FIG. 4 is a plan view of the apparatus shown in FIG. 3.

Apparatus suitable for production of the battery separator element of the present invention is shown in FIGS. 1 to 4. Referring to FIGS. 1 and 2, glass fibers 10 are drawn through orifices 12 in a glass melting furnace 14 and wound rapidly on a rotating drum 16. The drum is mounted on a spindle 17 which rotates in bearings 19 and is driven by means of a pulley 20 attached to the spindle and to suitable driving means (not shown). The furnace 14 is moved back and forth relative to the drum in a path parallel to the spindle as the fibers are wound around the drum.

It can be seen that as the furnace proceeds in one direction, a layer of fibers, parallel to each other, is laid upon the drum. As the direction of movement of the furnace is reversed, another layer of parallel fibers is laid upon the drum, but with the fibers of this layer being at a slight angle to the fibers of the previous layer. The furnace travels back and forth adjacent the rotating drum and builds up layers of fibers on the drum which layers form a condensed mat 22.

The speed of the traverse of the furnace 14 relative to the drum 16 and the spacing of the fibers as drawn from the orifices 12 is such that the parallel fibers of one layer do not completely cover the fibers of the preceding layer, but rather there remains slight spacing between the fibers in each layer. This spacing is believed to be necessary to permit fibers from one layer to penetrate, i.e., to twist over and under the fibers of the adjacent layers, during the subsequent stretching operation.

In accordance with the present invention, the speed of rotation of the drum is greater during the initial and/or the final portion of the time during which the condensed mat 22 is being formed as compared to the remaining portion of the time during which the drum is rotating to form the mat. The speed of traverse of the furnace 14 relative to the drum 16 may also be increased during the periods of increased r.p.m. of the drum.

A typical example of the present invention is described below. A condensed mat 22 is made utilizing a drum 4 feet in diameter and 6 feet in length. Glass fibers are collected on the spinning drum over a period of about 6 hours. During the first 2 hours and 15 minutes of the run, glass fibers having an average fiber diameter of 0.00155 inch are drawn and collected on the drum which is rotating at 109 r.p.m. In this portion of the run, the furnace 14 traverses the length of the drum 2.25 times per minute. Thereafter, the speed of the drum is increased gradually to 259 r.p.m. and the furnace to 5 traverses per minute over a period of about 20 minutes to form succeeding layers of fibers having an average diameter of 0.00081 inch throughout the remainder of the run.

The change in speed of rotation of the drum can be accomplished in a short period of time, i.e., several minutes, or gradually over a greater period of time such as one-half to one hour or more. As further embodiments of the invention, the speed of traverse of the furnace may be maintained substantially the same throughout the run or decreased when the r.p.m. of the drum is increased.

When the condensed mat is formed to the desired thickness, rotation of the drum is stopped and the drawing operation is discontinued. The condensed mat 22 is removed from the drum by cutting the fibers across the face of the drum in a line parallel to that of the axis of the drum and perpendicular to the general lay of the fibers. The mat 22 is next placed on a long table 24 with the fibers of the mat extending transversely of the table. It is then stretched to produce the mat 25 of the invention.

The stretching is initiated by grasping the fibers along the forward edge of the mat and pulling them in a direction perpendicular to the general lay of fibers. The fibers are sent through two sets of rollers 26 and 27 which continue the stretching operation until the fibers have rotated through an angle of about 30 to 45°. The rollers 27 travel at a greater peripheral velocity than the rollers 26. During this stretching, some of the fibers of one layer turn over and under the fibers of adjacent layers so as to tie the various layers together. Theoretically, the percentage of fibers in one layer which twist both over and under the fibers in adjacent layers should be very small, i.e., below 10 percent; however, in actual practice virtually all of the fibers, particularly the ends of the fibers, twist over and under and in between the fibers of adjacent layers.

Figure 5:
FIG. 5 is an enlarged sectional view of the mat shown in FIG. 4 taken along lines V—V.

An enlarged cross section of the mat 25 is shown in FIG. 5. The mat is made up of many layers of fibers with the fibers in each layer extending substantially completely across the mat and intertwining with the fibers of each adjacent layer. Approximately one-half of the fibers in each layer are parallel to each other and cross the remaining approximately one-half of the fibers of the same layer at an angle between 60 to 90°. The remaining approximately one-half of the fibers in each layer are also parallel to each other.

In FIG. 5, portion 28 of the layers of fibers contains the smaller diameter and densely associated fibers such as those which were formed during the final portion of the drawing operation described in the example above. Portion 29 contains the highly porous layers of larger diameter fibers formed during the initial portion of the drawing operation described above. The relationship of the fibers in each of the layers of portions 28 and 29 of mat 25 as produced by stretching condensed mat 22 are the same with the exception that the fibers in portion 28 are more densely associated.

After the mat is thus formed, it is coated and impregnated with a suitable binder 30 by passing it under a roller 31 and through a trough 32 containing the binder. The binder may be applied by other suitable means such as by spraying. It is applied to the fibers in sufficient quantity to enable them to be bonded together at their points of intersection but not film over the interstices of the fibers. The binder usually constitutes about 8 to 10 percent by weight of the finished mat. To insure that the binder does not close the interstices of the fibers, the mat 25 and binder thereon are drawn over a suction element 33 which pulls the excess binder from the mat. The excess binder is then returned to the trough 32.

If a heat curable resin such as a styrenated polyester, polystyrene or a phenol formaldehyde resin is employed, the mat is passed through a heating oven 35 to cure the resin and set the fibers in place. Thereafter the finished mat 25 is wound on a tube 36 or other suitable collecting means.

Numerous binder materials conventionally used as binders for glass fibers and which are inert to battery acids may be employed to set the fibers of the mat 25. Those given above are merely illustrative and are not intended to be limiting upon the binder material used. For example, other heat curable or catalyst curable resins such as the various polyacrylates including methyl methacrylate and methacrylate polymers and copolymers thereof, polyvinyl alcohol, polyvinyl acetate, polyethylene, silicones and others may be used.

The glass fiber mat 25 is next coated with the slurry described above to form the microporous layer 40. The principal constituent of the microporous layer is particles of inorganic material which are inert to battery reactions and materials present in the battery. These particles may vary in size between 200 to 400 mesh and are preferably finely divided particles of diatomaceous earth. Other inorganic particles such as silica, pulverized glass, kieselguhr, clay wollastonite, pumice and other natural and synthetic silicates may be used in finely divided form. It is important that these particles be free from impurities such as iron, aluminum, zirconium and their oxides and other materials which will react with battery acids and reduce the capacity of the battery. The particles make up approximately 70 to 80 percent by weight of the final dried microporous layer.

The particles are bound to each other by a suitable binder such as thermoplastic or thermosetting resins. The preferred binders are elastomeric materials such as natural and synthetic latices. Copolymers of butadiene and styrene are desired because they form battery separators which are tough and rigid, but other elastomers which are not affected or destroyed by the battery reactions and materials, such as natural rubber latex, butadiene-isobutylene copolymers, polyisobutylene, butadiene-acrylonitrile copolymers and silicone elastomers may be employed. Copolymers of butadiene and styrene containing about 60 percent by weight of styrene have been found to be most suitable. Combinations of the elastomers described above as well as the resins listed below may be employed as the binder material to take advantage of the desirable properties of each. Thermosetting resins such as phenol formaldehyde and thermoplastic resins such as polystyrene, polyacrylates, vinyl acetals and others may be used. Binder materials containing nitrogen and/or chlorine are less desirable because of their possible harmful effect on the battery reaction.

The binders are preferably utilized in the formation of the slurry as a suspension in a volatile, non-solvent liquid such as water. The solids content of the suspensions or emulsions may vary from about 25 to 60 percent by weight of the emulsion and preferably 40 to 50 percent by weight. The amount of binder employed with the particles may vary, but should be only sufficient enough to bind the particles together and not form a complete film of binder. Generally, 3 to 5 parts by weight of binder to 12 to 15 parts by weight of inert particles are employed.

It is important that the coating slurry have the proper viscosity upon application to the glass fiber mat to prevent the slurry from flowing into and impregnating the mat. The viscosity of the slurry may be controlled by the amount of water employed, but there are limits to the amount of water which can be present because the volatile material determines the degree of porosity of the microporous layer. It is the practice to employ in the slurry a viscosity controlling agent such as an aqueous solution of ammonium alignate containing about 1 percent by weight of ammonium alginate. Other agents such as gelatin and the like may be employed.

It is important that the relative amounts of the particles, binder, viscosity controlling agent and water in the slurry be established within certain ranges so that the particles are properly dispersed and adhered to each other, the viscosity of the slurry is proper for coating without penetration and proper porosity can be obtained. It has been determined that by employing 140 to 160 parts by weight of the particles, 40 to 60 parts by weight of binder, up to 4 parts by weight of viscosity controlling agent and 375 to 425 parts by weight of water in the slurry, the proper slurry is obtained.

Other materials may be added to the slurry in small amounts for various reasons. For example, small percentages of lignin, up to 1 part by weight to 20 parts by weight of particles may be added to the slurry and thus be present in the microporous layer. The lignin has a beneficial effect on the negative plate (lead). Also, small percentages of conventional antioxidants, such as BLE, a reaction production of diphenyl amine and acetone, may be used to prevent burning of the various elastomeric, binder materials during the heating and drying operation. Up to 1 percent by weight of the antioxidants based upon the weight of elastomeric material may be used. A small amount of wetting agent may be employed, up to 1 part by weight of wetting agent to 30 parts by weight of particles, to disperse the particles uniformly throughout the slurry and increase the ability of the slurry to adhere to the glass fiber layer. Conventional wetting agents such as dioctyl sodium sulfosuccinate, substituted aromatic sulfonates, sulfonated ethers and other conventionally employed wetting agents may be present.

Figure 6:
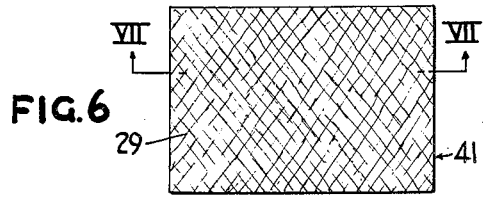
FIG. 6 is a plan view of a battery separator produced in accordance with this invention.
Figure 7:
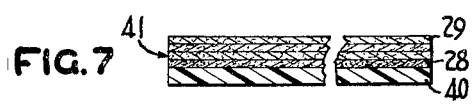
FIG. 7 is an enlarged sectional view taken along lines VII—VII of FIG. 6.

The coating slurry as described above is applied uniformly to the surface of portion 28 of the glass mat 25 containing the finer, more densely associated fibers so as to adhere to the surfacce of the mat but not substantially impregnate it. The coated glass fiber mat is then passed in 0.08 hour through a drying oven maintained at a temperature between 400 to 530° F. to drive off the water in the slurry and cause the binder to bond the particles to each other and to the glass fiber mat. The fine, densely associated layer of fibers prevents substantial impregnation of the slurry into the glass fiber mat during the coating and drying operations and thus renders the microporous layer 40 less subject to the formation of pin holes during the drying operation. The glass fiber mat and coating thereon is then cut to proper size for use in a battery. The battery separator 41 thus formed is shown in FIGS. 6 and 7.

Figure 8:
FIG. 8 is a plan view of a further embodiment of the invention.
Figure 9:
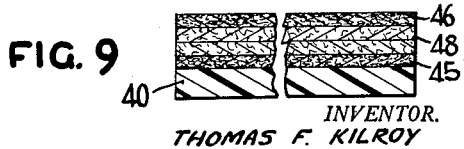
FIG. 9 is an enlarged sectional view taken along lines IX—IX of FIG. 8.

A battery separator 42 which is a further embodiment of the present invention is shown in FIGS. 8 and 9. The separator is formed by applying a slurry in the manner above described to one side of a glass fiber mat having fine, densely associated fibers on both surfaces 45 and 46 of the mat with a more porous layer 48 formed of thicker fibers intermediate the surfaces. This glass fiber mat is formed by stretching a condensed mat formed in the manner described above with the speed of rotation of the drum and traverse being greater at both the beginning and end of the run forming the condensed mat. One surface of this mat may be used to support the microporous layer and the other surface may be used as the retainer mat with the highly porous intermediate layer 48 of fibers being available for circulation of the electrolyte.

A glass fiber mat such as shown in FIGS. 8 and 9 and described above can be produced in the following manner. A condensed mat is made by collecting fibers on a spinning drum measuring 4 feet in diameter and 6 feet in length. During the first 12 minutes of the run, glass fibers having an average diameter of 0.00075 inch are drawn and collected on the drum which is rotating at 256 r.p.m. The furnace traverses the length of the drum 5 times per minute during these 12 minutes.

At the end of this period the drum speed is decreased in 1 to 2 minutes to 110 r.p.m. and the speed of traverse of the furnace is decreased so that it makes only 2.2 traverses per minute. These conditions are maintained for about 2 hours and 30 minutes and the average diameter of the fibers produced in this period is about 0.00118 inch. The original conditions are then resumed gradually over a 24 minute period and maintained for 5 hours and 24 minutes until the end of the run. The average diameter of the fibers produced in the final portion of the run is 0.00067 inch. The nature of the sampling and measuring of the fiber diameter is believed to account for the difference in average fiber diameter observed between the initial and final portions of the run.

The condensed mat thus produced is removed from the drum and stretched as described above. The side of the mat containing the greater concentration of fine fibers is coated with a suitable slurry as described above and dried to produce a battery separator. The layer of fine fibers produced during the initial portion of the run just described acts as a retainer mat for the oxide pastes.

The glass fiber mats of the present invention have enabled the production of superior battery separators. The separators produced utilizing these mats are virtually free from pin holes. These separators have exhibited improved performance characteristics when subjected to the conventional S.A.E. 20 hour-5-ampere battery discharge test and the conventional S.A.E. cold test (300 ampere discharge at 0° F. for 5 seconds). This is believed to be a result of the freer circulation of battery acids and gases permitted by the highly porous, thick fiber layers of the mat.

Although the present invention has been described with relation to specific details of certain embodiments thereof, it is not intended that such details be limitations upon the scope of the invention except insofar as included in the accompanying claims.

I claim:

1. A method of forming a battery separator which comprises drawing a group of fibers from a furnace which is passing back and forth relative to a spinning drum in a line approximately parallel with the axis of the drum, said drawing being due to the winding action of the drum, winding the fibers on the drum in layers with the fibers in each layer being substantially parallel to each other and at a small angle to the fibers in each adjacent layer to form a condensed mat of fibers, varying the speed of rotation of the drum so that it is greater during a terminal portion of the drawing and during the same period varying the rate of traverse of the furnace and stretching the condensed mat thus formed to the point where the fibers have been made to cross over each other and rotate between 30 to 45 degrees to the general lay of the fibers of the condensed mat, so proportioning said terminal drum speed and rate of furnace traverse as to cause the fibers formed during the terminal portion of the drawing to be finer and more densely associated with each other than are the remainder of the fibers in the stretched mat so as to provide a mat with a surface which is less porous than the remainder of the mat, applying to said denser formed surface an aqueous slurry comprising finely divided particles and a binder therefor, each of said slurry components being inert with respect to battery components and reactions, and heating the glass fiber mat and coating thereon to a temperature sufficient to dry the coating and cause the binder to adhere the particles to each other and to the glass fiber mat without substantial impregnation of the mat.

2. A battery separator comprising a single, integral, multilayer, unwoven mat of glass fibers wherein the fibers of each layer are substantially parallel to each other and extend substantially completely across the mat, the fibers in each layer crossing and intertwining with the fibers in each adjacent layer at an angle between 60 and 90° and the fibers of the layers adjacent at least one major surface of the mat being finer and more densely associated than the fibers in other layers of the mat, and a microporous layer adhered to but not substantially impregnating said major surface, the microporous layer comprising finely divided particles and a binder therefor, said particles and binder being inert with respect to battery components and reactions.

3. The battery separator of claim 2 wherein the binder is a copolymer of butadiene and styrene.

4. The battery separator of claim 2 wherein the fibers of both of the major surfaces of the mat are finer and more densely associated than the fibers of other layers of the mat.

5. The battery separator of claim 4 wherein the binder is a copolymer of butadiene and styrene.

References Cited in the file of this patent

UNITED STATES PATENTS

| | | |
|---|---|---|
| 2,015,006 | Ekisler | Sept. 17, 1935 |
| 2,306,347 | Slayter | Dec. 22, 1942 |
| 2,574,221 | Modigliani | Nov. 6, 1951 |
| 2,578,534 | Giles et al. | Dec. 11, 1951 |
| 2,653,985 | Philipps | Sept. 29, 1953 |